J. M. WILSON.
AUTOMATIC SWITCHING MECHANISM.
APPLICATION FILED AUG. 26, 1915.
1,219,519.
Patented Mar. 20, 1917.
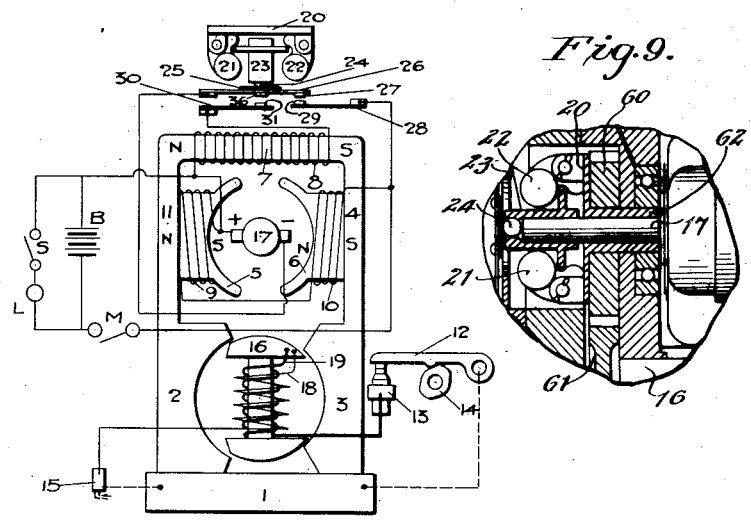
Fig. 9.
Fig. 1.
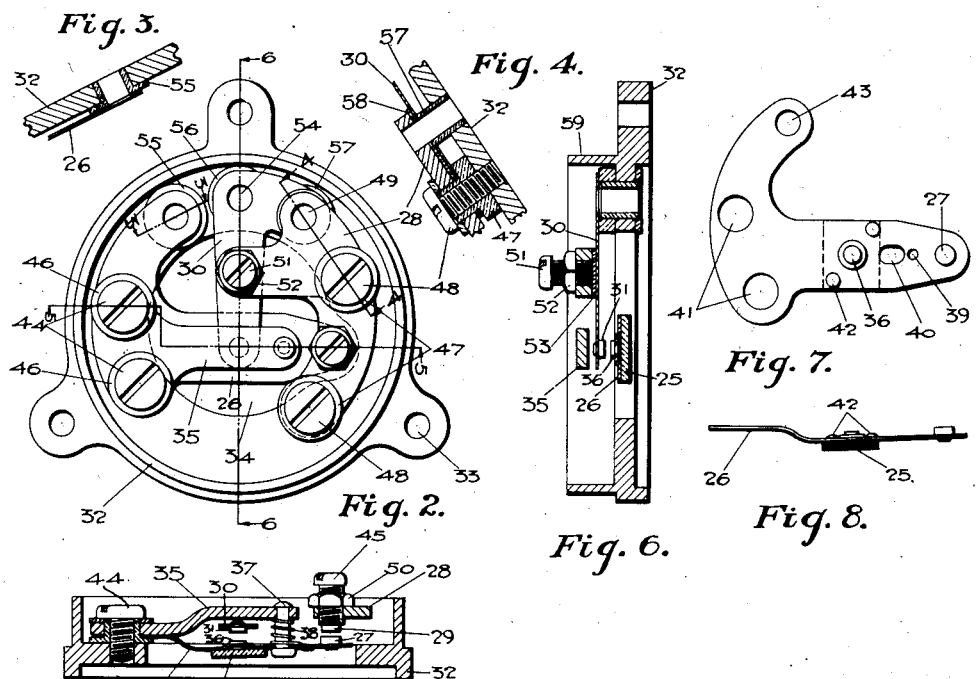
INVENTOR.
JAMES M. WILSON.
BY
ATTORNEY.
WITNESSES:

UNITED STATES PATENT OFFICE.

JAMES M. WILSON, OF NEWARK, NEW JERSEY, ASSIGNOR TO SPLITDORF ELECTRICAL COMPANY, OF NEWARK, NEW JERSEY.

AUTOMATIC SWITCHING MECHANISM.

1,219,519.   Specification of Letters Patent.   Patented Mar. 20, 1917.

Application filed August 26, 1915. Serial No. 47,462.

*To all whom it may concern:*

Be it known that I, JAMES M. WILSON, a citizen of the United States, residing at Newark, in the county of Essex and State of New Jersey, have invented certain new and useful Improvements in Automatic Switching Mechanism, of which the following is a specification.

My invention relates to improvements in switching mechanism used particularly in connection with generators designed to serve the double purpose of furnishing current for ignition and lighting or battery charging.

In my application, Serial Number 37202, filed June 30, 1915, I have shown and described a form of generator adapted for the work mentioned above. In this type of machine two armatures are employed, one of which generates high tension current and delivers the same through the proper instrumentalities to the spark plugs or ignition device of an internal combustion engine; the other armature is of the low tension direct current type and generates current for the purpose of charging a set of storage batteries, furnishing current for the lamps used on the vehicle in connection with which the generator is used and furthermore, the same armature supplies the current for exciting the field coils that supply magnetic flux for both armatures.

In such a machine, the low tension armature must be connected and disconnected to the external working circuit at the proper time, that is to say, the armature should not be connected to the storage battery until its voltage is slightly in excess of the battery voltage, otherwise the battery will discharge through the armature and drive it as a motor, thereby causing a waste of power; also when the battery is being charged and the speed of the vehicle is reduced for any reason, the battery must be disconnected when the voltage of the generator falls to a certain predetermined point. Furthermore, means must be provided to regulate the output of the low tension armature in particular, so that as the speed of the vehicle increases, the current delivered to the external working circuit will not be excessive, otherwise the battery will be "boiled out" or the lamps burned out.

In my former application above referred to, two forms of switching mechanisms are shown. The object of my present invention is to provide a switching mechanism which is an improvement over those shown in said application.

Other and further objects of my invention will be apparent to any one skilled in the art.

In the drawings which form a part of this specification, Figure 1 illustrates a somewhat diagrammatic type of generator which has been above referred to and to which my device is applicable. This figure corresponds to Fig. 7 of my co-pending application above referred to.

Fig. 2 is a plan view of an auxiliary plate carrying the switching mechanism, and which is adapted to be mounted on the frame work of a generator shown in Fig. 1.

Fig. 3 is a short section on the line 3—3 of Fig. 2.

Fig. 4 is a short section on the line 4—4 of Fig. 2.

Fig. 5 is a section on the line 5—5 of Fig. 2.

Fig. 6 is a section on the line 6—6 of Fig. 2.

Fig. 7 is a plan view of one of the switch members, and

Fig. 8 is a side view of Fig. 7.

Fig. 9 is a fragmentary sectional view of the generator showing a governor mechanism and also illustrating one method in which the same is attached to the gear of the low tension armature.

Referring now particularly to the drawings in which like numerals refer to corresponding parts in the various figures, 1 is a base of non-magnetic material to which is attached by any suitable means pole pieces 2 and 3. These pole pieces have extensions 11 and 4, to which are attached in any suitable manner, such as screws, pole pieces 5 and 6. Bridging the extensions 11 and 4 is a yoke 7 carrying a coil 8. Mounted on the pole pieces 5 and 6 are field coils 9 and 10. Between the pole pieces 2 and 3 and mounted on suitable bearings, in any well known manner is a high tension armature 16 which carries two windings 18 and 19. The primary winding 19 is connected through a circuit breaker consisting of the stationary contact 13, movable member 12 and cam 14, all in the usual manner. The secondary winding 18 is shown connected directly to a spark plug 15 but it is to be understood that if more than one cylinder is used, a suitable distributer is a necessary adjunct.

My present invention is not directed to the high tension features of the generator so the details in connection therewith will not be further described.

Mounted above the ignition armature 16 on suitable bearings in any well known manner is a low tension armature 17 which as shown in Fig. 9, carries the gear wheel 60 securely mounted upon the shaft thereof. The gear wheel 60 is adapted to mesh with a second gear 61 which is rigidly fixed upon the shaft of the high tension armature 16. In this manner the low tension armature is driven by the armature 16 through the medium of gears 60 and 61. The shaft of armature 16 is further provided with any well known and suitable means whereby it may be drivingly associated with any suitable source of power as the cam shaft of a motorcycle engine. This driving connection, which may be of any well known type, is not shown in the drawings as it forms no part of my invention. The plate 20 is adapted to be fastened to the gear on the low tension armature which meshes with the gear wheel on armature 16. Pivoted in any well known manner on the plate 20 are weighted arms 21 and 22. Associated with these arms is a sleeve 23 that is adapted to be mounted and to slide freely on the end of the low tension armature shaft 17. In Fig. 9 the plate 20, which carries the governor weights 21 and 22, fits up against the lateral surface of gear 60 and is secured thereto in any suitable manner. The plate 20 is seen to be integral with a sleeve 62 which in turn is keyed or otherwise fixed to the shaft of armature 17, whereby plate 20 and gear 60 rotate with said armature shaft. However it will be understood the plate 20 may be a separate element by itself, the only limitation being that it be adapted to rotate with the low tension armature 17. Since these features are readily understood, they are not described further herein.

In the end of sleeve 23 is a ball 24 adapted to run on a friction wearing plate 25, which in turn is attached to the switch member 26. The switch member 26 is insulated from the auxiliary plate 32 by means of suitable insulating bushings, one of which is shown as 55. Mounted on the plate 32 by means of screws 44 but insulated therefrom by bushings and insulators 46 is a bridge piece 35, which carries a stud 37. A spring 38 carried by stud 37 has one end adapted to enter the hole 39 in member 26 and is used to balance the action of member 26 and to help return the same to its normal positive after having been operated, thus assuring position opening of contacts 27 and 29 when the machine is at rest. The end of spring 38 is bent over after going through hole 39 so as to positively engage the member 26.

In assembling, the head of the stud 37 is caused to enter the oblong slot 40 of member 26 at an angle and the member 26 is then turned to the position shown in Fig. 5, in which position the member 26 rests on the head of the stud. The friction plate 25 is held to the member 26 in any suitable manner such as by rivets 42. Behind the member 25 is a depression in member 26 which carries a suitable contact 36, such as silver or platinum. On the end of the spring member 26 is mounted another contact point 27.

Attached to the auxiliary plate on the opposite side from the member 35 is a second bridge piece 28, which is fastened to plate 32 by means of screws 48, being insulated from the same by means of suitable bushings and insulators 47. The bridge piece 28 carries a contact-screw 45 which is adapted to be adjusted to any position and locked in position by means of a lock nut 50. Contact 29 carried on the end of the screw 45, is adapted to work in conjunction with contact 27. The bridge member 28 carries also an adjusting screw 51 held in position by lock nut 52.

Mounted on the plate 32 is a resilient member 30 carrying a contact point 31 adapted to engage with contact point 36. The member 30 is adapted to be adjusted by the screw 51, which, however, is separated from the member 30 by means of an insulator 53. By turning the bushing screw 51 in or out, the gap between contact point 31 and 36 may be varied to suit the conditions. The member 30 is insulated from plate 32 by means of insulators 56, 57 and 58, one end engaging insulator 57 to prevent its being displaced in position.

Through the member 26 is a hole 43, for the purpose of receiving a contact stud which completes the electrical connection from the negative terminal of the low tension armature 17 to the spring 26. Spring member 30 has a hole 54 for receiving a contact stud that completes the electrical connection from this spring to one end of the coil 8. Member 28 has a hole 49 for receiving a contact stud which completes the electrical connection from the member 28 to one end of the field coil 10 and the switch M, shown in Fig. 1. These stud connections are shown in detail in my co-pending application above referred to and are integral with but insulated from the end plates of the machine. The switch members mounted in the plate 32 form a unitary structure which is adapted to slip over the studs as described, the plate 32 being held to the main end plates by studs passing through holes 33. It will be understood that a dust cap is adapted to fit around the flange 59 of member 32 so as to inclose the switching mechanism.

I will now describe the operation of my switching mechanism. It is to be understood that the field coils 9 and 10 and the winding on the armature 17 are designed to generate a predetermined voltage at approximately a predetermined speed. When this speed is reached, the governor mechanism, consisting of the plate 20, weights 21 and 22 and sleeve 23 carrying ball 24 operating within the annular space 34, within the plate 32, acts against the friction wearing member 25 in such a manner as to push the resilient member 26 outward, thereby tending to close the contact points 27 and 29. The exact time of closure of these contacts being adjusted by means of the adjusting screw 45. When the contacts 27 and 29 are closed, it being assumed that the switch M has been previously closed, either by hand or automatically, the armature 17 will begin to send current through the battery B or to the lights L should switch S be closed. As the speed of the armature 17 increases, the resilient member 26 is pushed outwardly more and more until the contact point 36 engages contact point 31, when an electrical circuit will be completed through the coil 8, on the yoke 7. The coil 8 is so wound and connected that when this electrical circuit is closed, the flux generated by the coil 8 tends to decrease the magnetic flux through the armature 17 but increases it through the armature 16, thereby controlling the amount of power delivered by both of said armatures. That is to say, the energy from the low tension armature 17 is held below a value which would be detrimental to the battery B and lights L and the output of the ignition armature 16 is increased so as to give a hotter spark for the quick flame propagation of the gas in the engine cylinder which is necessary for high speed. The exact time of bringing into action coil 8 is regulated by means of adjusting screw 51, as has been already explained.

It will be noted that as the speed of the armature 17 is increased according to the engine speed, the governor weights 21 and 22 will tend to push the sleeve 23 farther out on the end of the armature shaft thereby putting greater pressure against the member 25. To overcome this objectional feature, the natural thing to do is to arrange stops on the arms carrying weights 21 and 22 which I have done but in order to take up the slight variations in manufacturing these stops, I have arranged the switch member 30 so that there is quite a little movement to the end thereof even after the contacts 31 and 36 have closed and before the end of the spring 30 can strike the bridge piece 35. This is accomplished by placing the adjusting screw 51 in the position shown in Fig. 2. Thus the member 26 has an outward movement sufficient to allow the governor weights 21 and 22 to act to their full limit without putting undue pressure on the friction wearing member 25. Furthermore, there is no tendency for member 26 to pivot on the contacts 31 and 36 which would tend to bend the spring at this point causing contacts 27 and 29 to open, which would be the case if there was no movement provided for the end of the spring 30 as above described.

It is thus seen that I have arranged the mechanism for controlling the electrical circuits of a generator, such as described, in a compact and substantial manner and have provided quick detachable means for connecting these elements into the various circuit relations.

While I have shown one form of my improvement, I do not wish to be limited to the exact details shown as certain changes and alterations may be made in minor details without departing from the spirit of the invention or the scope of the appended claims.

Having thus described my invention, what I claim is:—

1. In combination with an electrical generator having high and low tension armatures, a working circuit for said low tension armature and an auxiliary electrical circuit serving to control the output of both armatures, a plurality of switch members having a pair of switch contacts in said working circuit and a pair of switch contacts in said auxiliary circuit, a friction wearing plate carried on one of the switch members and a centrifugal governor operated by said low tension armature and acting against said wearing plate to first close the contacts in said working circuit and then to close the contacts in said auxiliary circuit, for the purpose described.

2. In combination with an electrical generator having high and low tension armatures, a working circuit for said low tension armature and an auxiliary electrical circuit serving to control the output of both armatures, a mounting plate adapted to be connected to the frame of said generator, a resilient switch member mounted on but insulated from said plate and carrying two contacts, one in said working circuit and the other in said auxiliary circuit, a second resilient member mounted on but insulated from said plate carrying a contact adapted to coöperate with said contact in said auxiliary circuit, a bridge member attached to but insulated from said plate carrying an adjustable contact adapted to coöperate with said contact in said working circuit, a friction wearing plate attached to the first mentioned resilient member and a centrifugal governor operated by said low tension armature and acting against said wearing plate to first close said working circuit and then to close said auxiliary circuit, for the purpose described.

3. In combination with an electrical generator having high and low tension armatures, a working circuit for said low tension armature and an auxiliary electrical circuit serving to control the output of both armatures, a mounting plate adapted to be connected to the frame of said generator, a resilient switch member mounted on but insulated from said plate and carrying two contacts, one in said working circuit and the other in said auxiliary circuit, a bridge member attached to but insulated from said plate but in electrical contact with said resilient switch member, a stud carried by said bridge member and adapted to support the outer end of said resilient member, a second resilient member mounted on but insulated from said plate and extending below said bridge member and carrying a contact adapted to coöperate with said contact in said auxiliary circuit, a second bridge member attached to but insulated from said plate carrying an adjustable contact adapted to coöperate with said contact in said working circuit, a friction wearing plate attached to the first mentioned resilient member, a centrifugal governor operated by said low tension armature and acting against said wearing plate to first close said working circuit and then to close said auxiliary circuit, and resilient means carried on said stud for the purpose of steadying the action of the first mentioned resilient member and to assist in returning said member to its normal position after having been operated by said governor.

4. In combination with an electrical generator having high and low tension armatures, a working circuit for said low tension armature and an auxiliary circuit for controlling the output of both armatures, a mounting plate adapted to be connected to the frame of said generator, a bridge member and a resilient member connected to said plate but insulated therefrom by the same means, a stud attached to said bridge member at its outer extremity, said stud serving as a support for the outer end of said resilient member, contacts carried by said resilient member on either side of said stud support, one of said contacts being in the working circuit and the other being in the auxiliary circuit, a second resilient member mounted on but insulated from said plate and carrying a contact adapted to coöperate with said contact in said auxiliary circuit, a second bridge member mounted on but insulated from said plate and carrying an adjustable contact adapted to coöperate with said contact in said working circuit, a friction wearing plate attached to said first mentioned resilient member and a centrifugal governor operated by said low tension armature and acting against said wearing plate, to first close said working circuit and then to close said auxiliary circuit and means carried on said second bridge member for adjusting the time of closure of said auxiliary circuit.

5. In combination with an electrical generator having high and low tension armatures, a working circuit for said low tension armature and an auxiliary electrical circuit serving to control the output of both armatures, a resilient switch member carrying two contact points, a rigid member carrying an adjustable contact point adapted to engage one of said contact points on said resilient member, a second resilient member carrying a point adapted to engage the other of said contact points on the first mentioned resilient member, a plate for carrying said resilient and rigid members, said plate being adapted to be attached to said generator frame as a unitary structure, said resilient and rigid members being adapted to receive contact studs whereby said contact points are connected respectively into their relative positions in the working and auxiliary circuits when said plate is attached to said generator.

6. In combination with an electrical generator having high and low tension armatures, a working circuit for said low tension armature and an auxiliary electrical circuit serving to control the output of both armatures, a resilient switch member carrying two contact points, a rigid member carrying an adjustable contact point adapted to engage one of said contact points on said resilient member, a second resilient member carrying a point adapted to engage the other of said contact points on the first mentioned resilient member, a plate for carrying said resilient and rigid members, said plate being adapted to be attached to said generator frame as a unitary structure, said resilient and rigid members being adapted to receive contact studs whereby said contact points are connected respectively into their relative positions in the working and auxiliary circuits, when said plate is attached to said generator, and a friction wearing plate on the first mentioned resilient switch member, a governor operated by said low tension armature against said wearing plate to cause said switch member to close and open said circuits according to the speed of said armature.

7. In a device of the character described, the combination of an electric current generator having a working circuit for supplying low tension current and an auxiliary electrical circuit serving to control the output of said low tension current in the working circuit, a unitary structure adapted to be readily attached to and detached from said generator frame, consisting of the following instrumentalities: a plate, a resilient member carrying two contact points, one for the working circuit and the other for said auxiliary circuit, a bridge member carrying a stud for supporting the end of said resilient member between said two contact points, a spring guided by said stud and engaging said resilient member for steadying its movement and aiding in holding same in its normal position, a second resilient member carrying a contact in the auxiliary circuit, a second bridge member carrying a contact in said working circuit and means carried on said second bridge member for adjusting the normal distances between said contact points.

8. In a device of the character described, the combination of an electric current generator having a working circuit for supplying low tension current and an auxiliary electrical circuit serving to control the output of said low tension current in the working circuit, a unitary structure adapted to be readily attached to and detached from said generator frame, consisting of a mounting plate, a resilient member carrying two contact points, one for the working circuit and the other for said auxiliary circuit and a friction wearing plate attached to said resilient member behind one of said contact points, a bridge member carrying a stud for supporting the end of said resilient member between said two contact points, means attached to said resilient member and acting between it and said bridge member for steadying the movement of said resilient member and aiding in holding the same in its normal position, a second resilient member carrying a contact in said auxiliary circuit, a second bridge member carrying a contact in said working circuit, means carried on said second bridge member for adjusting the normal distances between all of said contact points, a governor device operated by said generator armature and acting on said wearing piece to close said contacts at predetermined speeds, said resilient and bridge members being arranged on said mounting plate so as to allow the governing mechanism to reach the limit of its movement before said wearing plate has reached the limit of its movement, for the purpose described.

9. In combination with an electrical generator, an automatic switching mechanism comprising a mounting plate, a plurality of contacts carried thereon and adapted to control a plurality of working circuits for said generator, a speed responsive device to actuate said contact points in accordance with the speed of the generator, means independent of said speed responsive device and carried by said mounting plate for adjusting the time of closure of the contact points with respect to the speed of the generator, and provision whereby the various elements of said switching mechanism may be suitably mounted in compact form upon the frame or housing of said generator.

10. In combination with an electrical generator having working circuits therefor, an automatic switching mechanism operated in accordance with the speed of the generator to control such working circuits, whereby the output of the generator is regulated, said switching mechanism comprising a mounting plate, rigid members carried by said mounting plate, flexible members carried by said mounting plate, contact points associated with said rigid and flexible members, a speed responsive device adapted to coöperate with said switching mechanism in such a way that said contact points are opened and closed at predetermined speeds of the generator, said mounting plate constituting a housing for the various elements of the switching mechanism and being detachably mounted in a suitable position on the generator frame.

In witness whereof, I affix my signature.

JAMES M. WILSON.